US009127732B2

(12) United States Patent
La Forest et al.

(10) Patent No.: US 9,127,732 B2
(45) Date of Patent: Sep. 8, 2015

(54) RIGIDIZATION OF POROUS PREFORM PRIOR TO DENSIFICATION

(75) Inventors: Mark L. La Forest, Morristown, NJ (US); Slawomir Fryska, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 13/117,711

(22) Filed: May 27, 2011

(65) Prior Publication Data

US 2012/0302117 A1    Nov. 29, 2012

(51) Int. Cl.
| | |
|---|---|
| *B32B 5/02* | (2006.01) |
| *B32B 3/26* | (2006.01) |
| *B32B 3/10* | (2006.01) |
| *F16D 69/02* | (2006.01) |
| *C04B 35/83* | (2006.01) |
| *B29C 43/00* | (2006.01) |
| *B29C 45/14* | (2006.01) |
| *B32B 5/26* | (2006.01) |

(52) U.S. Cl.
CPC .............. *F16D 69/023* (2013.01); *C04B 35/83* (2013.01); *B29C 43/003* (2013.01); *B29C 45/14786* (2013.01); *B32B 5/26* (2013.01); *C04B 2235/614* (2013.01); *C04B 2235/616* (2013.01); *Y10T 428/249953* (2015.04); *Y10T 442/20* (2015.04)

(58) Field of Classification Search
CPC .... B32B 5/26; B29C 43/003; B29C 45/14786
USPC ....................................................... 264/29.1
See application file for complete search history.

(56) References Cited

U.S. PATENT DOCUMENTS

| | | | |
|---|---|---|---|
| 3,927,186 A * | 12/1975 | Vinton et al. ............... | 423/447.1 |
| 6,342,171 B1 | 1/2002 | Murdie et al. | |
| 6,537,470 B1 | 3/2003 | Wood et al. | |
| 6,939,490 B2 | 9/2005 | La Forest et al. | |
| 7,172,408 B2 | 2/2007 | Wood et al. | |
| 7,727,448 B2 | 6/2010 | Boutefeu et al. | |
| 2003/0111752 A1 | 6/2003 | Wood et al. | |
| 2005/0164578 A1 | 7/2005 | LoFaro et al. | |
| 2006/0177663 A1* | 8/2006 | Simpson et al. ............... | 428/408 |

(Continued)

FOREIGN PATENT DOCUMENTS

| | | |
|---|---|---|
| CN | 102030554 A | 4/2011 |
| CN | 102060555 A | 5/2011 |

(Continued)

OTHER PUBLICATIONS

Cho et al. ("Effect of Resin Impregnation Methods at the Early Stage of Densification on the Impregnation Efficiency, Microstructure, and Thermal Stability of Carbon-Carbon Composites", Cho, Donghwan et al. Jounal of Applied Polymer Science, vol. 85, pp. 183-192 (2002)).*
Examination Report dated Sep. 19, 2012, for counterpart EP Application No. 12 167 950.0, 5 pages.
European Search Report from counterpart EP Application No. 12167950.0, mailed Aug. 21, 2012, 4 pages.

(Continued)

*Primary Examiner* — Alison Hindenlang
*Assistant Examiner* — Robert J Grun
(74) *Attorney, Agent, or Firm* — Shumaker & Sieffert, P.A.

(57) ABSTRACT

A liquid carbonizable precursor is infused into a porous preform, and the infused precursor is subsequently pyrolyzed to convert the precursor to a carbon. The carbon enhances rigidity of the preform. In some examples, the preform can be densified to define a carbon-carbon composite brake disc for use in the aerospace industry.

15 Claims, 3 Drawing Sheets

(56) References Cited

U.S. PATENT DOCUMENTS

| | | | |
|---|---|---|---|
| 2009/0200700 A1 | 8/2009 | Marlin et al. | |
| 2010/0129551 A1* | 5/2010 | Fryska et al. | 427/256 |
| 2011/0110787 A1 | 5/2011 | Belmonte et al. | |
| 2011/0124253 A1* | 5/2011 | Shah et al. | 442/60 |

FOREIGN PATENT DOCUMENTS

| | | |
|---|---|---|
| EP | 0 601 808 A1 | 6/1994 |
| EP | 2527129 A1 | 11/2012 |
| GB | 1 485 528 | 9/1977 |
| GB | 1 485 529 | 9/1977 |
| WO | 2004050319 A1 | 6/2004 |

OTHER PUBLICATIONS

Office Action, and translation thereof, from counterpart Chinese application No. 201210165477.6, dated Dec. 10, 2014, 15 pp.

Cao, N. et al., "Preparation of biomedical carbon/carbon composites and their bone tissue biocompatibility," Abstract in English only, Journal of Shandong University (Engineering Science), vol. 37, No. 1, Feb. 28, 2007, 6 pp.

Examination Report from counterpart European Patent Application No. 12167950.0, dated Dec. 22, 2014, 3 pp.

Response to Examination Report dated Dec. 22, 2014, from counterpart European Patent Application No. 12167950, filed Dec. 30, 2014, 8 pp.

* cited by examiner

RIGIDIZATION OF POROUS PREFORM PRIOR TO DENSIFICATION

TECHNICAL FIELD

The present disclosure is directed to a porous preform, such as a porous preform that may be used to manufacture a carbon-carbon composite.

BACKGROUND

Some carbon-carbon composite bodies, such as some carbon-carbon composite brake discs that are used in the aerospace industry, may be manufactured from porous preforms. The preforms may be densified using one of several processes, such as chemical vapor deposition/chemical vapor infiltration (CVD/CVI), vacuum/pressure infiltration (VPI), high pressure impregnation/carbonization (PIC), or resin transfer molding (RTM), which may apply carbon within the porous preform.

SUMMARY

In general, the present disclosure is directed to rigidizing a porous preform prior to densifying the preform using a processing step that may subject the preform to a relatively large pressure or a vacuum (e.g., a high-pressure resin transfer molding (RTM) process), which may compromise the integrity of the preform. In some examples, a liquid carbonizable precursor is infused into the preform and the infused precursor may be subsequently pyrolyzed to form a carbon in the preform that enhances the rigidity of the preform. In some cases, the precursor is infused at least to a predetermined depth within the preform in order to enhance the rigidity of the preform at least to the predetermined depth, wherein the predetermined depth may be particularly vulnerable to forces applied during a subsequent densification process. The carbon that is formed by pyrolyzing the precursor may have an open cell structure that permits the infiltration of a densifying agent, such as a resin or a pitch that is infiltrated into the porous preform using a high-pressure RTM process.

In one example, the present disclosure is directed to a method comprising infusing a liquid carbonizable precursor substantially into a porous preform, and pyrolyzing the infused precursor to convert the precursor to a carbon, wherein the carbon enhances rigidity of the preform.

In another example, the disclosure is directed to a carbon-carbon composite preform comprising a porous preform body comprising porosity substantially throughout the body, and a carbonizable precursor infused substantially into the porosity of the porous preform body, wherein the carbonizable precursor is pyrolyzable to form a carbon configured to enhance a rigidity of the porous preform body when the precursor is pyrolyzed.

In another example, the disclosure is directed to a carbon-carbon composite preform comprising a porous preform body comprising porosity substantially throughout the body, and a carbon formed substantially throughout the porosity of the porous preform body, wherein the carbon enhances a rigidity of the preform body.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
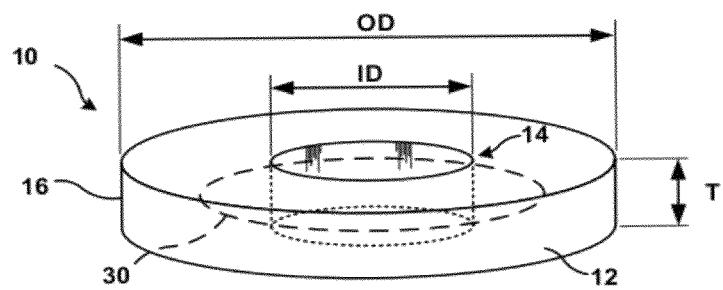
FIG. 1 is a perspective view of an example porous preform that may be used to manufacture a carbon-carbon composite body.

In general, the present disclosure is directed to rigidizing a porous preform (e.g., increasing a rigidity of the preform), which can be subsequently further processed to form a carbon-carbon composite body. The carbon-carbon composite body may be further processed, for example, to form a carbon-carbon composite brake disc for use in the aerospace industry. It can be desirable to densify the carbon-carbon composite body in order improve the thermal conductivity of the body; in some cases, as the density of the carbon-carbon composite body increases, the better it conducts heat, and the better it acts as a heat sink. In one example, a porous preform is rigidized by infusing a liquid carbonizable precursor into the porous preform and subsequently pyrolyzing the precursor to form a rigidizing and/or stabilizing carbon. The carbon may provide enhanced structural strength and/or rigidity to the porous preform relative to the structure of the preform prior to the introduction of the carbonizable precursor into the preform and the pyrolization of the precursor. A porous preform that has been rigidized by infusion and pyrolization of the precursor may be better able to withstand forces (e.g., shear forces) exerted on the preform by subsequent processing that might have otherwise compromised the integrity of the preform, such as by delaminating the preform.

In some examples, the carbonizable precursor is infused substantially into a porous preform body, such as at least to a predetermined depth into the porous preform body. For example, the precursor may be infused to a depth of at least about 50% of the distance from exterior surfaces of the preform body to a geometric center of the preform body, such as to a depth of at least about 70% of the distance from the exterior surfaces to the geometric center, such as to a depth of at least about 90% of the distance from the exterior surfaces to a geometric center or throughout the entire preform. The infused precursor is subsequently pyrolyzed to form a rigidizing carbon within the porous preform. In some examples, the precursor is infused substantially throughout the entire preform body and the rigidizing carbon formed by pyrolyzing the carbonizable precursor is formed substantially throughout the entire preform body. The carbon that is formed by pyrolyzing the precursor has an open cell structure that permits the infiltration of a densifying agent through a subsequent densifying process.

In some examples, a porous preform may be infused with the carbonizable precursor and the precursor may be pyrolyzed prior to subjecting the preform to any processing techniques that may compromise the integrity of the preform, such as densification that may subject the preform to a relatively large pressure or a vacuum and/or to rapid infiltration of a densifying agent. Examples of processing techniques that may compromise the integrity of the preform include, but are not limited to, resin transfer molding (RTM) or other high pressure/vacuum and/or rapid infiltration processing steps. The rigidized preform may be able to better withstand the relative high pressures, relatively high densifying agent infusion rates, and the resulting forces, such as shear forces and pressure, that are exerted onto the preform compared to a preform that was not rigidized using the techniques described herein. For example, a rigidized preform in accordance with the present disclosure may be able to withstand the shear forces and other forces exerted by a densifying agent without the preform being delaminated.

Some processes used to densify porous preforms (e.g., to form carbon-carbon composites, such as carbon-carbon brake discs) include applying a relatively high pressure or a vacuum, or may involve rapid infiltration of a densifying agent to impregnate the porous preform with the densifying agent. For example, the commonly-assigned U.S. Pat. No. 6,537,470 to Wood et al., issued on Mar. 25, 2003, and the commonly-assigned U.S. Pat. No. 7,172,408 to Wood et al., issued on Feb. 6, 2007, each describe a RTM process where a densifying agent, such as a resin or pitch, is injected into a mold holding a porous preform at relatively large pressures and at relatively high infiltration speeds to substantially completely infiltrate the resin or pitch into the porous preform. The entire content of U.S. Pat. Nos. 6,537,470 and 7,172,408 are incorporated by reference as if reproduced herein. In some examples, RTM may be performed in a mold at pressures between about 9 megapascals (about 1300 pounds per square inch (PSI)) and about 20.5 megapascals (about 3000 PSI), for example between about 12.4 megapascals (about 1800 PSI) and about 18.96 megapascals (about 2750 PSI), in order to impregnate a porous preform with a resin or pitch within a very short period of time, for example between about 15 seconds and about 40 seconds, such as between about 18 seconds and about 25 seconds, or between about 20 seconds and about 22 seconds.

A porous preform may need to be reinforced or rigidized prior to implementation of relatively high pressures/vacuums and/or rapid infiltration processing steps to help avoid or reduce damage to the porous preform, which may be presented in the form of delamination of layers or other structures of a porous preform comprising a plurality of porous layers. For example, U.S. Pat. Nos. 6,537,470 and 7,172,408, cited above, describe a single cycle of chemical vapor deposition/chemical vapor infiltration (CVD/CVI) prior to infiltrating a preform with resin or pitch via RTM to rigidize the preform. Some CVI/CVD processes deposit a very thin layer of carbon, e.g., between about 2 micrometers and about 10 micrometers, onto structures within the porous preform, such as onto fibers that form a fibrous porous preform. However, CVD/CVI may not reach a sufficient depth within the preform such that large pressures or vacuums and/or rapid infiltration of a densifying agent within the porous preform may lead to damage, such as delamination.

The present disclosure describes methods of rigidizing a porous preform prior to processing steps (e.g., densification processes) that may subject the porous preform to potentially damaging physical conditions, such as relatively large pressures or a relatively large vacuum and/or rapid infiltration of a densifying agent that may be used to infiltrate the preform with a high-viscosity, medium-to-high char yielding pitch or resin. In some examples, the rigidizing described herein may be performed prior to any other rigidizing or densification steps, such as prior to any CVD/CVI or RTM processes. In other examples, the rigidization of a preform via the use of a carbonizable precursor that is subsequently pyrolyzed is performed after a single CVD/CVI step.

In some examples, the methods include rigidizing at least a predetermined thickness of the porous preform. In other examples, substantially the entire preform may be rigidized using the techniques described herein. Some example methods described herein comprises infusing the porous preform with a carbonizable precursor that is configured to be infused at least to a predetermined depth into the porous preform body, such as substantially into an inner portion of the porous preform, followed by pyrolyzing the precursor in order to enhance the rigidity of the porous preform. In one example, the precursor is selected to have a viscosity that is sufficiently low so that the precursor can infuse substantially throughout the entire porous preform. In some examples, the precursor is selected so that, upon pyrolization, the precursor will form a carbon have a substantially open cell structure in order to permit for further infusion by a densifying agent, such as a pitch or resin, that is injected into the preform using RTM or one or more other densification processes.

FIG. 1 is a perspective view of an example porous preform 10 that may be used in the manufacture of a carbon-carbon composite body, such as a carbon-carbon composite brake disc. Examples of preforms that may be used as preform 10 include, but are not limited to: a fibrous preform, such as a woven fiber preform, a carbon fiber preform, a ceramic fiber preform, a nonwoven fiber preform, chopped-fiber and binder preforms, such as polyacrylonitrile (PAN) based carbon fibers bound together by a binder material, binder-treated random fiber preforms; non-fibrous preforms, such as foam preforms, porous carbon body preforms, and porous ceramic body preforms; or previously rigidized preforms (which may be fibrous or non-fibrous preforms that have been rigidized by method described herein or have been rigidized by other methods). In some examples, preform 10 comprises a plurality of mechanically bound layers, which can be, for example, a plurality of fibrous layers, such as a plurality of woven or nonwoven fabric layers, connected together, e.g., bound by a binder, such as a resin binder, or via needle-punching of the plurality of layers. In other examples, preform 10 does not comprise predefined layers, but, rather, can be formed from a bundle of fibers that are mechanically bound together, e.g., via needling. In other examples, a combination of any of the aforementioned types of preforms can be used.

In one example, shown in FIG. 1, preform 10 has a generally disc-shaped geometry so that a carbon-carbon composite made from preform 10 may be generally disc-shaped, e.g., for use as a brake disc. Disc-shaped preform 10 comprises a disc-shaped porous body 12 with a central bore 14 extending through an axial thickness of body 12. In one example, disc-shaped preform 10 has an inner diameter ID at bore 14, an outer diameter OD at a radial edge 16, and an axial thickness T, which is measured in a direction substantially orthogonal to the direction in which inner diameter ID and outer diameter OD are measured.

Figure 2:
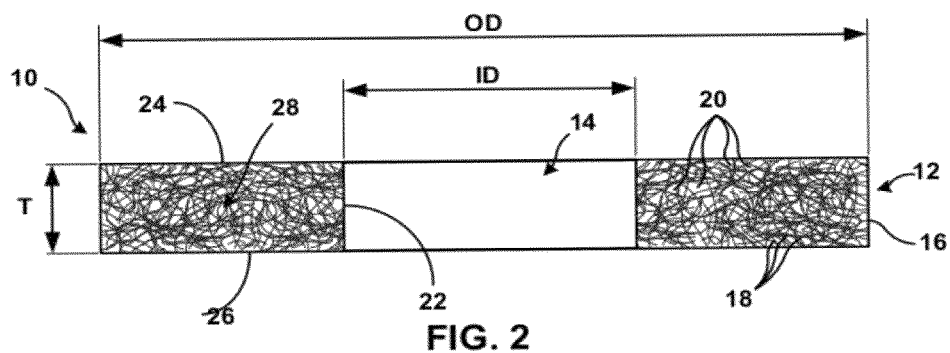
FIG. 2 is a lateral cross-sectional view of an example porous preform.

FIG. 2 illustrates a lateral cross-sectional view of an example preform 10, which is taken through a center of preform 10 through bore 14. Porous body 12 of preform 10 may comprise, for example, a plurality of fibers 18 that define a plurality of pores 20 within porous body 12. The porosity of body 12 extends substantially throughout the thickness T of body 12. As described above, fibers 18 may be bound together by a binder, or fibers 18 may be formed into a plurality of fibrous layers (not shown) that are bound or needle-punched together. Fibers 18 and pores 20 are not necessarily shown to scale, but rather are shown conceptually in order to illustrate aspects of the present disclosure.

As noted above, preform 10 may be rigidized or stabilized before being further processed (e.g., densified) to form a carbon-carbon composite, such as by RTM densification. In some cases, preform 10 is rigidized using the techniques described herein prior to any densification steps. In some examples, preform 10 is rigidized by infusing a carbonizable precursor into porous preform body 12 followed by pyrolyzing the precursor to convert the precursor into a rigidizing carbon. In one example, the precursor is infused at least to a predetermined depth within preform 10. As used herein, "predetermined depth" may refer to an absolute or relative depth from outer edges of preform body 12, such as from outer edge 16, from inner edge 22 (e.g., an inner edge 22 that defines bore 14), from upper edge 24, and from lower edge 26. In one example, precursor may be configured to be infused to a relative depth of at least about 15% from the outer edges 16, 22, 24, 26 (e.g., at least about 15% of the difference between inner diameter ID and outer diameter OD from each of outer edge 16 and inner edge 22, and at least about 15% of thickness T from each of upper edge 24 and lower edge 26), for example at least about 25% from outer edges 16, 22, 24, 26, such as at least about 30% from outer edges 16, 22, 24, 26, for example at least about 40% from outer edges 16, 22, 24, 26 (e.g., at least about 40% of the difference between inner diameter ID and outer diameter OD from each of outer edge 16 and inner edge 22, and at least about 40% of thickness T from each of upper edge 24 and lower edge 26).

In one example, the precursor is configured to be infused substantially throughout the entire porous preform body 12 so that an inner portion 28 of porous preform body 12 is substantially filled with the precursor. The term "inner portion" may refer to a generally geometrically-centered region within body 12, wherein the inner portion has a volume that is a predetermined percentage of the total volume of the preform, such as between about 15% and about 50% of the volume of the preform, such as between about 20% and about 30% of the volume of the preform.

In one example, for a generally annular preform, such as the example preform 10 shown in FIG. 1, a geometric center of preform body 12 will generally be an annulus 30 (FIG. 1) that is generally axially centered within porous preform body 12, e.g., generally centered within thickness T, and that is generally radially centered within porous preform body 12, e.g., generally centered between inner diameter ID at inner edge 22 and outer diameter OD at outer edge 16. By way of example, an "inner portion" may be defined as a predetermined percentage of the radius of porous preform body 12 on either side of center annulus 30, such as at least about 50% of the radius (e.g., at least about 25% of the radius of center annulus 30 on either side of center annulus 30), for example at least about 30% of the radius (e.g., at least about 15% of the radius on either side of center annulus 30), such as at least about 20% of the radius (e.g., at least about 10% of the radius on either side of center annulus 30), for example at least about 15% of the radius (e.g., at least about 7.5% of the radius on either side of center annulus 30). In another example, preform body 12 comprises a plurality of fibrous layers bonded, laminated, or needle-punched together, and inner portion 28 may comprise a predetermined number of inner layers of the plurality of layers on either side of a generally axially centered layer. In one example, the precursor is infused substantially throughout the entire porosity of porous body 12.

In one example, the carbonizable precursor may be infused into porous preform body 12 using vacuum infiltration. The vacuum infiltration may comprise immersing porous preform body 12 in the liquid precursor and subjecting preform 10 and the liquid precursor to a vacuum, such that the liquid precursor wicks into porous preform body 12. In one example, vacuum infiltration may be performed at room temperature (e.g., between about 20° C. (about 68° F.) and about 25° C. (about 77° F.)). In another example, porous preform body 12 may be heated slightly, e.g., up to a temperature of about 40° C. (about 105° F.), to aid infusion of the carbonizable precursor into pores 20 within inner portion 28, or in some examples, throughout pores 20 of substantially the entire porous preform body 12.

In some examples, the carbonizable precursor may comprise a material or materials with a viscosity that is sufficiently low so that the precursor may be infused substantially throughout the entire bulk of porous preform body 12, e.g., so that the precursor is infused at least to a predetermined depth within preform 10 or so that the precursor is infused substantially into inner portion 28 of body 12. The precursor may be, for example, relatively non-viscous. In one example, the viscosity of the carbonizable precursor is between about 4 centipoise and about 100 centipoise, for example between about 4 centipoise and about 50 centipoise, such as about 4.5 centipoise.

In one example, the carbonizable precursor may comprise a tow-carbon yielding precursor, e.g., a precursor having a carbon yield when pyrolyzed of less than about 50%, for example about 20%. Low-carbon yielding precursors may have lower viscosities than relatively higher-carbon yielding precursors, such as medium-carbon yielding precursors or high-carbon yielding precursors, e.g., those having a carbon yield of at least 50%, for example at least about 90% or greater than 90% e.g., 92%).

In some examples, the carbonizable precursor may comprise one or more low-carbon yielding compounds, such as low-carbon yielding alcohols, for example furfuryl alcohol. Other examples of carbonizable precursors include, but are not limited to, low-melting point isotropic pitches, low-carbon yielding pitches, such as coal tar pitch. In one example, the precursor may comprise a material that forms an open cell carbon immediately upon pyrolization. An example of such a precursor is furfuryl alcohol. In another example, the precursor may comprise a material that partially or substantially seals pores 20 when pyrolyzed, but which can be converted to an open-cell carbon 32 via further processing. An example of the later example is a coal tar pitch that, upon pyrolization, may partially or substantially seal pores 20, wherein the sealed porosity may be reopened by charring and heat treating, and if necessary machining, the pyrolyzed coal tar pitch.

Figure 3:
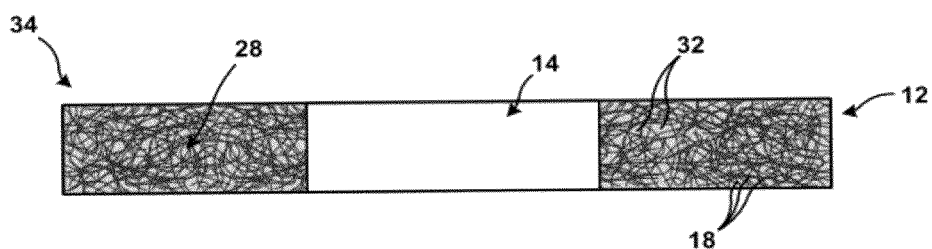
FIG. 3 is a lateral cross-sectional view of an example porous preform after infusing the preform with a precursor and pyrolyzing the precursor to rigidize the preform.

After infusing the precursor into porous preform body 12, the precursor is pyrolyzed to form a carbon that enhances the rigidity and/or the stability of porous preform body 12. FIG. 3 shows the same cross-sectional view as in FIG. 2, but after the precursor has been infused into porous body 12 and pyrolyzed to form carbon 32 within porous body 12 to form a rigidized preform 34. In one example, carbon 32 is configured to enhance a rigidity of inner portion 28 of preform body 12. In examples in which the precursor is infused substantially throughout the entire porosity of porous preform body 12, carbon 32 may be formed substantially throughout porous preform body 12 in order to enhance the rigidity substantially throughout the entire rigidized preform 34 when compared to a rigidity of the non-rigidized preform 10. Rigidized preform 34, comprising preform 10 with a rigidizing carbon 32 formed within pores 20 of preform body 12, has greater structural rigidity than non-rigidized preform 10 such that rigidized preform 24 may better withstand forces exerted on rigidized preform 24 by further processing that may compromise the integrity of preform 24, such as high-pressure RTM densification processing.

In one example, carbon 32 adds material within preform 24 that provides for additional structural integrity within preform 24, and, thus, carbon 32 may enhance a through thickness toughness of preform 10, e.g., by enhancing a toughness and/or rigidity of preform 24. In some cases, carbon 32 increases the rigidity and/or toughness of an inner portion 28 of preform 24, e.g., inner layers in examples in which preform body 12 is defined by a plurality of layers, as well as outer portions, e.g., outer layers examples in which preform body 12 is defined by a plurality of layers, of preform 24. Enhancement of the toughness and/or rigidity of preform 10 may be relative to the toughness and/or rigidity of non-rigidized preform 10 prior to introduction of the carbonizable precursor into preform 10 and prior to the subsequent pyrolyzing of the precursor within preform 10.

In one example, shown in FIG. 3, carbon 32 is formed within pores 20 of porous preform body 12. In examples wherein porous preform body 12 comprises a plurality of fibers 18, carbon 32 may substantially surround a majority of fibers 18, and in one example, carbon 32 may substantially surround substantially all of the plurality of fibers 18. However, in some examples, carbon 32 may not continuously coat fibers 18. Rather, after carbonization of preform body 12 and the precursor, carbon that is formed within pores 20 may be in a noncontinuous layer on fibers 18, e.g., define a cracked surface. The relatively high temperature at which the precursor is pyrolyzed may result in the cracking of the carbon from the precursor. The noncontinuous carbon 32 within pores 20 may be useful for increasing the surface area that is within pores 20, which can be useful for increasing the density of body 12 after a subsequent densification step, such as a CVD/CVI, VPI, or RTM densification step. For example, carbon 32 may define a surface to which resin, pitch or carbon from the subsequent densification step may attach. In this way, pores 20 may be partially filled with carbon 32 in a configuration that permits additional densification to take place.

Carbon 32 that is formed by pyrolyzing the infused precursor is configured to bond to carbon fiber or other densifying agents used in subsequent densification steps. In one example, carbon 32 that is formed by pyrolyzing the infused precursor has an open cell structure in order to allow for the infiltration of a densifying agent, such as a pitch (e.g., isotropic or mesophase pitch) or resin used in a RTM processing step (described in more detail below), through rigidized preform 34 (e.g., through carbon 32 and substantially throughout preform body 12). The open cell structure may also allow for the infiltration of carbon formed during a CVD/CVI step. In an open cell structure, openings of about 10 microns to about 250 microns are defined, although other sizes are contemplated. The size of pores 20 after formation of carbon 32 is selected such that the densifying agent can fill pores 20.

In one example, the carbonizable precursor may be pyrolyzed by heating the infused preform body 12 up to at least the charring temperature of the precursor. In one example, the infused preform body 12 may be heated to a temperature of between about 250° C. (about 480° F.) and about 810° C. (about 1490° F.), for example at least about 550° C. (about 1020° F.). In some examples, the infused porous preform 12 may be subjected to a relatively small pressure, for example between about 110 kilopascals (about 16 pounds per square inch (PSI)) and about 350 kilopascals (about 50 PSI). However pressurization may not be necessary in other examples.

The rigidization of preform 10 by infusing and pyrolyzing porous preform body 12 with a carbonizable precursor, as described above, may be performed in addition to other methods of rigidization or stabilization of porous preform body 12. In one example, porous preform body 12 may be rigidized and/or stabilized by a cycle of chemical vapor deposition/chemical vapor infiltration (CVD/CVI) that deposits a relatively thin carbon film, e.g., between about 2 micrometers and about 10 micrometers, over the structures of porous preform body 12, such as over fibers 18. However, as noted above, in some examples CVD/CVI may be not result in the sufficient deposition of rigidizing material to an inner portion 28 of porous preform body 12. Thus, the techniques including a precursor described herein may be used to increase the rigidity of preform 10 in addition to or instead of CVD/CVI processing.

In one example, CVD/CVI rigidization is performed prior to infusing the carbonizable precursor into porous preform body 12, so that the infused precursor is coated over any carbon deposited by CVD/CVI. For example, in one example, a single cycle of CVD/CVI can be performed prior to infusing any carbonizable precursor into porous preform body 12 and pyrolyzing the precursor. In another example, more than one cycle of CVD/CVI is performed prior to infusing carbonizable precursor into porous preform body 12 and pyrolyzing the precursor. In another example, infusing porous preform body 12 with a carbonizable precursor and pyrolyzing the precursor may be performed before CVD/CVI rigidization.

Figure 4:
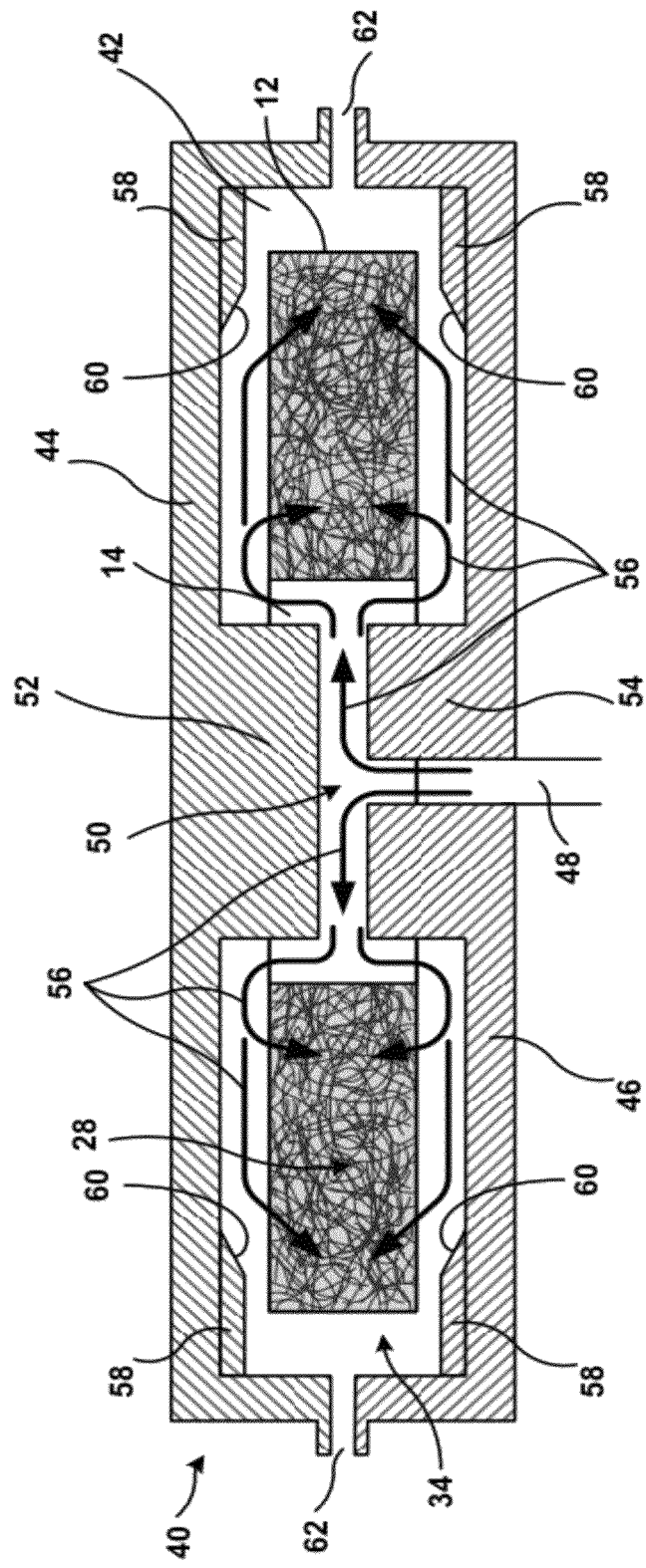
FIG. 4 is a lateral cross-sectional view of an example mold that may be used to infiltrate a densifying agent into a rigidized preform.

After forming rigidized preform 34, such as via CVD/CVI and subsequently infusing and pyrolyzing a carbonizable precursor in porous preform body 12, as described above, preform 34 may be further processed so that the resulting carbon-carbon composite has desired properties. In one example, rigidized preform 34 is densified, for example using a RTM process that infiltrates a densifying agent, such as a pitch or resin, into rigidized preform 34. FIG. 4 is a lateral cross-sectional view of a mold 40 that may be used, for example for RTM processing, to infiltrate a resin or pitch into rigidized preform 34. In one example, mold 40 defines a generally annular chamber 42 between an upper mold portion 44 and a lower mold portion 46. An inlet 48, such as a nozzle, feeds a resin or pitch into a gate 50. In one example, gate 50 is defined by upper gate 52, which may be part of upper mold portion 44, and lower gate 54, which may be part of lower mold portion 46.

Rigidized preform 34 is placed into chamber 42. In one example, shown in FIG. 4, upper gate 52 and lower gate 54 extend axially into central bore 14 of preform 34 to secure preform 34 in a desired position within chamber 42. The flow path of a densifying agent, such as a pitch or resin, is shown conceptually by arrows 56 in FIG. 4. The densifying agent flow path 56 passes from inlet 48 into gate 50 where the densifying agent is distributed throughout chamber 42 and infiltrated into rigidized preform 34 so that the densifying agent is distributed throughout the open pore structure of carbon 32 formed by pyrolyzing the rigidizing precursor.

In one example, mold 40 further comprises one or more baffles 58 which may be formed in upper mold portion 44 and/or lower mold portion 46 and extend into chamber 42. Baffles 58 may create a flow-resistance differential in mold 40 by creating a smaller axial clearance between baffles 58 and preform 34 than is created between mold portions 44, 46 and preform 34. In one example, shown in FIG. 4, baffles 58 are formed generally at an outer diameter of chamber 42 to create a flow-resistance differential in mold 40 generally from the outer diameter of mold 40 toward gate 50. The differential may create greater flow resistance at baffles 58, e.g., at the outer diameter of chamber 42, and a decreasing flow resistance radially along preform 34 from the outer diameter of preform 34 toward bore 14. Baffles 58 may allow for relatively high-viscosity densifying agents, such as an aromatic resin (AR) mesophase pitch, that provide for relatively high carbon yields (e.g., >80% carbon yield) while still providing for infiltration of the densifying agent substantially throughout preform 34. In one example, each baffle 58 comprises a tapered portion 60 that tapers toward an axial center of mold 40 as tapered portion 60 extends radially outward toward the outer diameter of mold 40.

Mold 40 may also be configured to provide for venting of air or volatiles from mold chamber 42. In one example, shown in FIG. 4, mold 40 comprises one or more vents 62 for venting air or other volatiles. Venting may be performed during injection of the densifying agent into chamber 42, which drives air and volatiles out of mold 40 through vents 62. In other examples, a vacuum may be applied to mold chamber 42, such as through vents 62, during injection of the densifying agent.

FIG. 4 depicts mold 40 having only a single chamber 42 that is provided for a single rigidized preform 34. However, in other examples, a mold may be configured with a chamber that is capable of holding a plurality of rigidized preforms 34 or a plurality of chambers each holding one or more rigidized preforms 34 so that the plurality of rigidized preforms 34 may be infiltrated with the densifying agent at substantially the same time. Other configurations of a mold used for RTM may also be used to densify rigidized preform 34.

In one example, the densifying agent, such as a resin or pitch, may be rapidly injected into mold 40, e.g., within between about 10 seconds and about 40 seconds, such as about between about 15 seconds and about 40 seconds, using an injection apparatus. In one example, the injection apparatus may comprise a heater extruder that melts a densifying agent feedstock, such as resin pellets, and feeds the liquid densifying agent to an accumulator. An injector, such as a piston, may drive the liquid densifying agent into mold 40 at a relatively high pressure and at a relatively high velocity. In one example, the injector may be configured to deliver the densifying agent to mold 40 at a pressure of between about 9 megapascals (about 1300 pounds per square inch (PSI)) and about 20.5 megapascals (about 3000 PSI), for example between about 12.4 megapascals (about 1800 PSI) and about 18.96 megapascals (about 2750 PSI), and may be configured to deliver substantially all of the melted densifying agent in the accumulator to mold 40 in between about 15 seconds and about 40 seconds, for example between about 18 seconds and about 25 seconds, such as between about 20 seconds and about 22 seconds. Further description of an example injection apparatus and method of using the apparatus is described in the commonly-assigned U.S. Pat. Nos. 6,537,470 and 7,172,408.

As shown in FIG. 4, flow path 56 of the densifying agent flows into the interior of preform 24, e.g., into inner portion 28. As described above, RTM may involve the densifying agent being injected into mold 40 at relatively high pressures. The densifying agent may also be injected into mold 40 by subjecting mold to a vacuum pressure, for example a vacuum with an absolute pressure of below about 500 Torr, such as 100 Torr or lower. In order to increase the depth of impregnation of a high-carbon yield densifying agent. RTM processing may also involve rapidly injecting the densifying agent into mold 40 in order to rapidly impregnate preform 24 with the densifying agent. This rapid impregnation at a large pressure or vacuum may apply forces across preform within mold 40 that may ordinarily compromise the structural integrity of the preform, particularly if the densifying agent is a high carbon-yield, high viscosity densifying agent, such as by exerting relatively large shear forces within the preform body. For example, in examples in which the porous preform body comprises a plurality of laminated layers, the rapid impregnation at high pressure or vacuum may act to delaminate the layers of porous preform body 12. Rigidizing carbon 32 acts to provide additional structural support to porous preform body 12 so that rigidized preform 34 may be able to withstand the RTM process, for example by providing enhanced structural support against the shear forces exerted by the rapid infiltration of the densifying agent at a large pressure or vacuum.

Examples of densifying agents that may be used in an RTM process using mold 40 including liquid resin or pitches (e.g., isotropic and/or mesophase pitches) that provide a relatively high carbon yield, e.g., of greater than about 80%, and may have a relatively high viscosity, such as synthetic mesophase pitches, coal-tar derived pitches, such as thermally or chemically treated coal tar, petroleum-derived pitches, synthetic-pitch derivatives, thermally treated pitches, catalytically converted pitches, and thermoset or thermoplastic resins, such as phenolic resins. An example of a synthetic mesophase pitch that may be used in a RTM process is an aromatic resin (AR) mesophase pitch made by Mitsubishi Gas Chemical Company, Inc. (Tokyo, Japan) or a catalytically polymerized naphthalene.

After injecting the densifying agent into rigidized preform 34, the densifying agent may be pyrolyzed to remove any non-carbon containing elements, which may convert the densifying agent infiltrated preform 34 into a carbon-carbon composite. In one example, where a synthetic mesophase pitch is used, such as AR mesophase pitch, the pitch may be pyrolyzed using hot isostatic pressurization (HIP). In another example, the densifying agent, such as an AR mesophase pitch, may be stabilized by heating the densifying agent infiltrated preform 34 in an oxygen-containing environment to a temperature below the softening point of the densifying agent, e.g., between about 150° C. and about 240° C. for an AR mesophase pitch. The oxygen may react with the densifying agent to provide for cross-linking within the densifying agent. Once a suitable amount of oxygen has been absorbed and/or reacted into the densifying pitch, preform 34 may be raised to pyrolysis temperatures without melting the densifying agent or exuding any of the densifying agent from preform 34.

Further processing may be performed after the densifying agent has been infiltrated into preform 34 and pyrolyzed. For example, if there is still some open porosity within the densifying agent infiltrated preform 34, one or more further densification steps may be performed, such as additional CVD/CVI processing, RTM, VPI, or any combination thereof. The carbon-carbon composite formed from the densifying agent infiltrated preform 34 may be further processing, such as by charring or heat treatment. The resulting carbon-carbon composite body may also be shaped, e.g., via machining, into a desired shape, such as a final brake disc shape.

Figure 5:
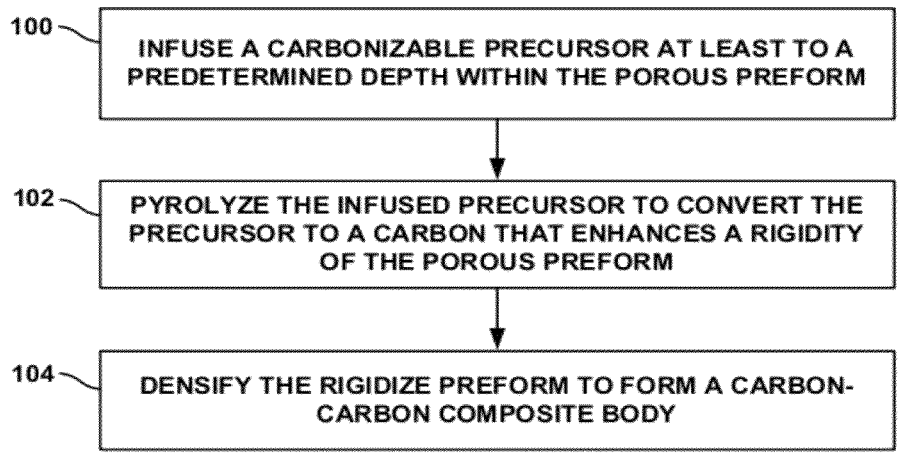
FIG. 5 is a flow chart illustrating an example method of manufacturing a carbon-carbon composite body from a porous preform.

FIG. 5 is a flow diagram illustrating an example method of manufacturing a carbon-carbon composite body. The example method comprises infusing a carbonizable precursor to at least a predetermined depth within a porous preform 10 (100) and pyrolyzing the precursor to convert the precursor to a rigidizing carbon 32 (102). The carbon is configured to enhances a rigidity of porous preform 10, such that the infusion of the precursor and subsequent pyrolization of the precursors results in a rigidized preform 34 (FIG. 3). The example method may further comprise densifying the rigidized preform 34 to form a carbon-carbon composite body (104). In some examples, rigidized preform 34 is densified using one or more densification processes, such as, but not limited to, CVD/CVI, RTM, or VPI. In one example, described above densifying rigidized preform 34 (104) comprises performing a rapid RTM process with a high viscosity, high carbon-yield resin or pitch, such as an AR mesophase pitch, followed by pyrolyzing the resin or pitch.

Figure 6:
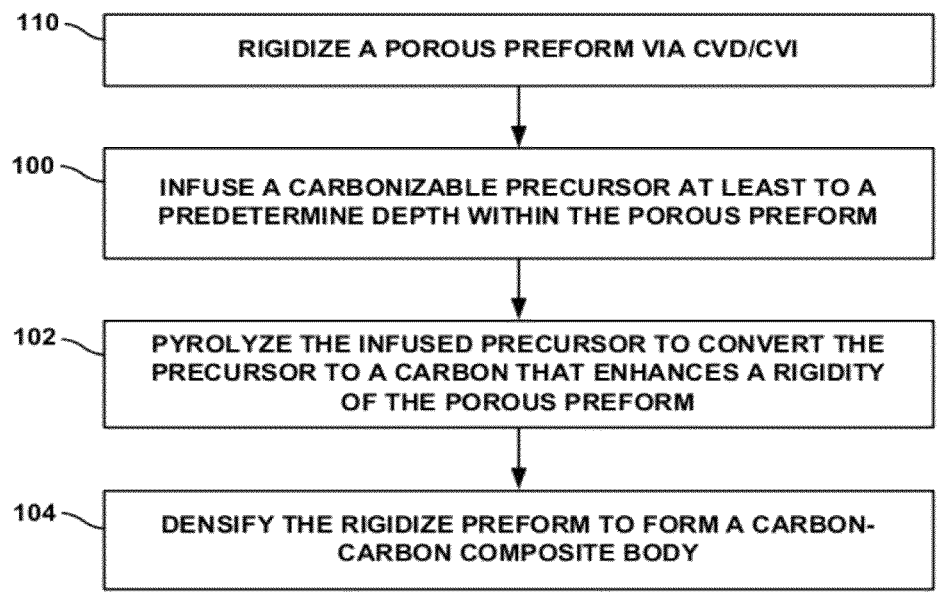
FIG. 6 is a flow chart illustrating another example method of manufacturing a carbon-carbon composite body from a porous preform.

FIG. 6 shows another example method of manufacturing a carbon-carbon composite body. The method shown in FIG. 6 is similar to that shown in FIG. 5, but includes rigidizing a porous preform 10 via a CVD/CVI processing step (110) prior to infusing a carbonizable precursor to at least a predetermined depth within a porous preform 10 (100). In some examples, only one CVD/CVI cycle (110) is performed prior to infusing the carbonizable precursor into preform 10 (100). In another example, not shown, instead of or in addition to the CVD/CVI rigidization performed prior to infusing the carbonizable precursor into porous preform 10, the CVD/CVI rigidization may be performed after pyrolyzing the precursor (114) but before densifying the rigidized preform 34 (104), e.g., via RTM processing.

Various examples have been described. These and other examples are within the scope of the following claims.

The invention claimed is:

1. A method comprising:
    infusing a liquid carbonizable precursor into a porous preform, wherein the liquid carbonizable precursor comprises a low-carbon yielding precursor comprising furfuryl alcohol, and wherein the liquid carbonizable precursor has a carbon yield of less than about 50% when pyrolyzed;
    pyrolyzing the infused liquid carbonizable precursor to convert the precursor to a carbon, wherein the carbon enhances rigidity of the porous preform to form a rigidized preform;
    after pyrolyzing the infused liquid carbonizable precursor, infiltrating the rigidized preform with a densifying agent via resin transfer molding by at least:
        placing the rigidized preform into a chamber of a mold; and
        delivering substantially all of the densifying agent into the mold in between about 10 seconds and about 40 seconds at a pressure of between about 9 megapascals (MPa) and about 20.5 MPa to infiltrate the rigidized preform with the densifying agent, wherein the carbon formed by pyrolyzing the infused liquid carbonizable precursor provides sufficient rigidity to the rigidized preform to prevent delamination of the rigidized preform during the infiltration of the densifying agent into the rigidized preform; and
    pyrolyzing the densifying agent.

2. The method of claim 1, wherein the densifying agent comprises at least one of a high carbon yielding, high viscosity resin or pitch comprising at least one of a derivative of coal tar precursor, a derivative of a petroleum precursor, a derivative of a synthetic pitch precursor, a synthetic pitch, a coal tar pitch, a petroleum pitch, a mesophase pitch, or a high char-yield thermoset resin.

3. The method of claim 1, wherein the porous preform comprises one of a fibrous preform, a carbon fiber preform, a nonwoven preform, a random fiber preform including a binder, a rigidized preform or a foam preform.

4. The method of claim 1, wherein the liquid carbonizable precursor has a viscosity that is sufficiently low to permit infusion substantially into an inner portion of the porous preform.

5. The method of claim 1, further comprising, after pyrolyzing the infused precursor, further rigidizing the rigidized preform via chemical vapor deposition/chemical vapor infiltration.

6. The method of claim 1, further comprising, prior to infusing the liquid carbonizable precursor into the porous preform, rigidizing the porous preform via chemical vapor deposition/chemical vapor infiltration.

7. The method of claim 1, wherein infusing the liquid carbonizable precursor into the porous preform comprises immersing the porous preform in the liquid carbonizable precursor in the presence of a vacuum.

8. The method of claim 1, wherein infusing the liquid carbonizable precursor into the porous preform comprises infusing the liquid carbonizable precursor to a depth of at least about 50% of a distance from exterior surfaces of a preform body of the porous preform to a geometric center of the preform body.

9. The method of claim 8, wherein the liquid carbonizable precursor is infused to a depth of at least about 70% of the distance from exterior surfaces of the preform body of the porous preform to the geometric center of the preform body.

10. The method of claim 8, wherein the liquid carbonizable precursor is infused to a depth of at least about 90% of the distance from exterior surfaces of the preform body of the porous preform to the geometric center of the preform body.

11. The method of claim 8, wherein the liquid carbonizable precursor is infused substantially throughout an entire preform body of the porous preform.

12. The method of claim 1, wherein the mold comprises at least one baffle, wherein the at least one baffle creates a flow-resistance differential within the chamber of the mold during infiltration of the densifying agent.

13. The method of claim 1, wherein substantially all of the densifying agent is delivered into the mold in between about 18 seconds and about 25 seconds at a pressure of between about 12.4 MPa and about 18.96 MPa.

14. A method comprising:
    infusing a liquid carbonizable precursor into a porous preform, wherein the liquid carbonizable precursor comprises a low-carbon yielding precursor comprising furfuryl alcohol, and wherein the liquid carbonizable precursor has a carbon yield of less than about 50% when pyrolyzed;
    pyrolyzing the infused liquid carbonizable precursor to convert the precursor to a carbon to form a rigidized preform, wherein the carbon enhances rigidity of the porous preform;
    after pyrolyzing the infused liquid carbonizable precursor, infiltrating the rigidized preform with a densifying agent by at least:
        placing the porous preform into a chamber of a mold; and
        subjecting the mold to a vacuum with an absolute pressure of below about 500 torr to deliver the densifying agent into the mold, wherein the carbon formed by pyrolyzing the infused liquid carbonizable precursor provides sufficient rigidity to the rigidized preform to prevent delamination of the rigidized preform during the infiltration of the densifying agent into the rigidized preform; and
    pyrolyzing the densifying agent.

15. The method of claim 14, wherein the absolute pressure is below about 100 torr.

* * * * *

UNITED STATES PATENT AND TRADEMARK OFFICE
CERTIFICATE OF CORRECTION

PATENT NO. : 9,127,732 B2  Page 1 of 1
APPLICATION NO. : 13/117711
DATED : September 8, 2015
INVENTOR(S) : Mark L. La Forest et al.

It is certified that error appears in the above-identified patent and that said Letters Patent is hereby corrected as shown below:

In the Specification

Column 6, line 33: "...greater than 90% e.g., 92%)." should be changed to -- greater than 90% (e.g., 92%). --

Signed and Sealed this
Seventeenth Day of May, 2016

Michelle K. Lee
*Director of the United States Patent and Trademark Office*